United States Patent [19]

Regehr et al.

[11] 4,240,814
[45] Dec. 23, 1980

[54] DROPLET SEPARATOR

[75] Inventors: Ulrich Regehr, Süsterfeldstr. 65, 51 Aachen; Horst Hannemann, Herzogenrath; Ludwig Speitkamp, Aachen, both of Fed. Rep. of Germany

[73] Assignee: Ulrich Regehr, Aachen, Fed. Rep. of Germany

[21] Appl. No.: 935,915

[22] Filed: Aug. 23, 1978

[30] Foreign Application Priority Data

Aug. 25, 1977 [DE] Fed. Rep. of Germany ....... 2738257

[51] Int. Cl.$^3$ .............................................. B01D 45/16
[52] U.S. Cl. ......................................... 55/423; 55/440
[58] Field of Search .................. 55/278, 440, 257 PV, 55/392, 394, 423; 261/112

[56] References Cited

U.S. PATENT DOCUMENTS

| 2,555,125 | 5/1951  | Gregory        | 55/440     |
|-----------|---------|----------------|------------|
| 2,760,597 | 8/1956  | Brixius        | 55/440     |
| 3,374,994 | 3/1968  | Greer          | 261/112    |
| 3,502,596 | 3/1970  | Sowards        | 55/278 UX  |
| 3,616,615 | 11/1971 | Woodbury       | 55/278     |
| 3,618,778 | 11/1971 | Benton et al.  | 261/112 UX |
| 3,702,527 | 11/1972 | Frew           | 55/440     |
| 3,952,077 | 4/1976  | Wigley         | 261/112    |
| 3,963,810 | 6/1976  | Holmberg et al.| 261/112    |
| 4,054,529 | 10/1977 | Pielkenrood    | 55/440 X   |

FOREIGN PATENT DOCUMENTS

| 480617  | 1/1975  | Australia      | 55/440  |
| 393022  | 12/1908 | France         | 55/278  |
| 1351605 | 5/1974  | United Kingdom | 261/112 |

*Primary Examiner*—Kathleen J. Prunner
*Attorney, Agent, or Firm*—Karl F. Ross

[57] ABSTRACT

A droplet separator for removing drops of liquid from a gas stream comprises a stack of corrugated plates each of which is generally planar but has a plurality of corrugations formed by alternating crests and troughs of given wavelength and amplitude. The troughs of adjacent plates register with one another to define flow passages for the gas stream extending generally in a flow direction between the inlet and outlet sides of the stack. The crests of adjacent plates contact one another between the flow passages and each of the flow passages is formed with at least two bends in the plate plane effecting direction change in the gas flowing therethrough. The corrugations are all of trapezoidal cross section.

8 Claims, 9 Drawing Figures

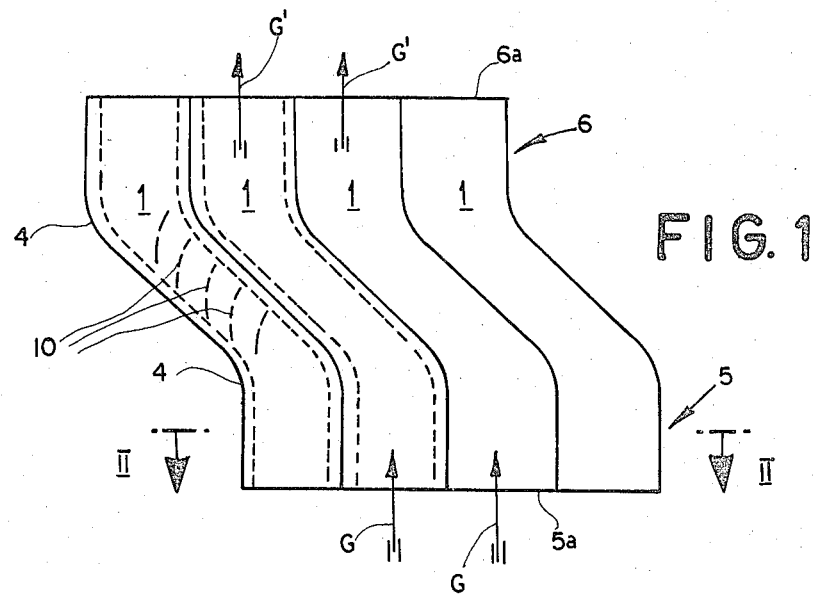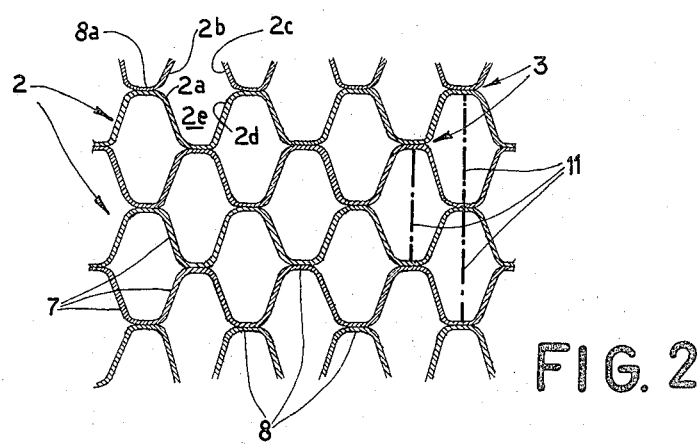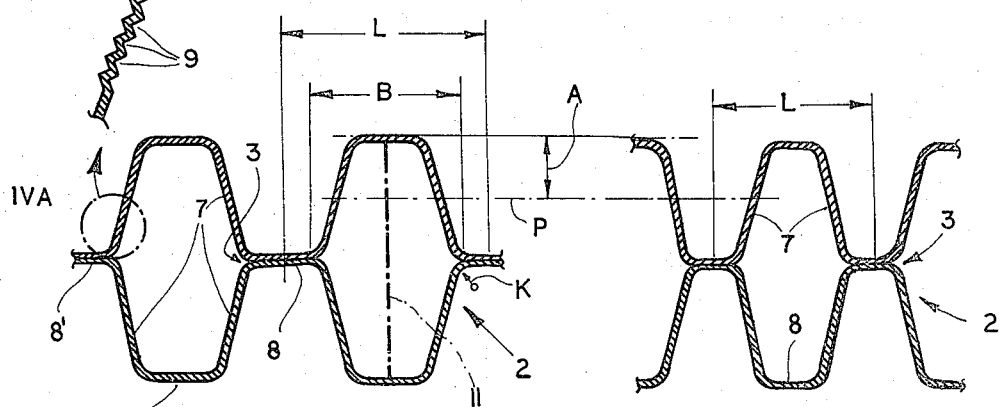

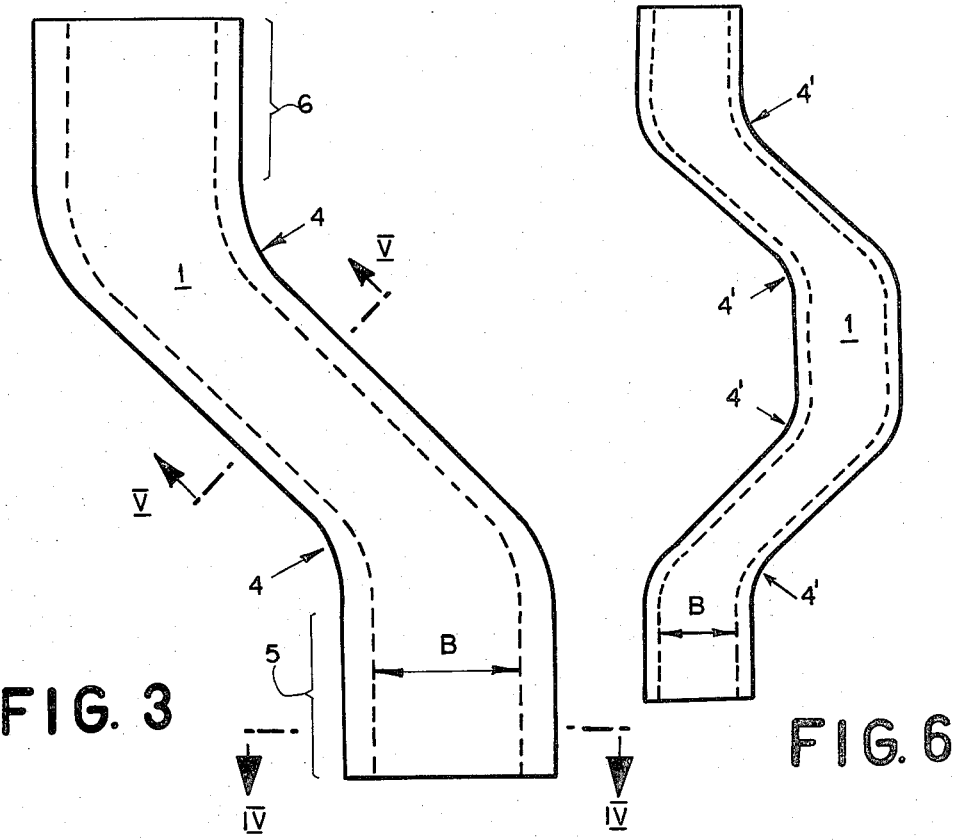
FIG. 3
FIG. 6
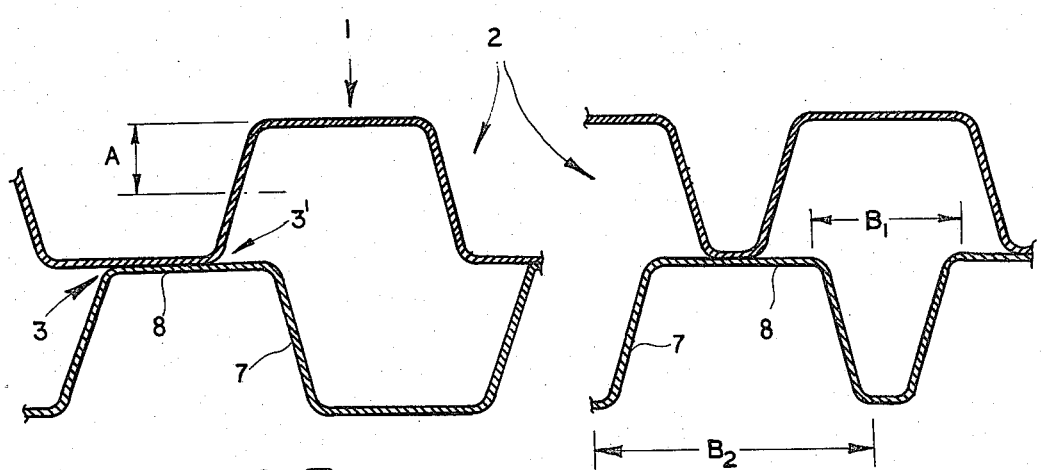
FIG. 7
FIG. 8

DROPLET SEPARATOR

FIELD OF THE INVENTION

The present invention relates to a droplet separator for removing drops of liquid from a gas stream and, more particularly, to a droplet separator formed from a stack of corrugated plates in which the corrugations form flow passages with direction change for the gas stream.

BACKGROUND OF THE INVENTION

Droplet separators are known in which flow passages are provided between the inlet and outlet sides of a stack of corrugated plates whose corrugations define the flow passages betweem them. Such flow passages are of the direction-change type in which two or more bends are provided for deflecting the gas stream first to one side and then to another so that the droplets collect on the walls of the flow passages by reason of the direction change and because of their inertia and are removed from the gas stream.

Where two adjacent plates join, the flow passages or, more specifically, the flanks thereof and hence flanks of the troughs of the corrugations, meet in a gusset or crevice which acts as a collecting channel for the liquid and permits the liquid collected on the walls of the flow passage to run off.

The corrugations may all be of a given wavelength and amplitude. The term "wavelength" is used herein to refer to the transverse distance between two corresponding points for each pair of successive corrugations, each corrugation being understood to include a trough and a crest. The term "amplitude" is used herein to refer to the height of the crest or the depth of the trough, i.e. the dimension of the corrugation as measured perpendicular to a median plane lying midway between the tops of said crests and bottom of a trough between a pair of crests.

The amplitude and wavelength is selected in accordance with the quantity of gas to traverse the stack in a given time and thus in accordance with the flow velocity. Another factor in dimensioning the corrugations is the droplet loading of the gas stream, i.e. the quantity of liquid contained or entrained in the gas stream, and the limiting droplet size for separation, i.e. the limiting separation particle size. The limiting separation particle size is the smallest droplet size for which 100% removal is assured.

Naturally, the dimensions must be selected in accordance with these parameters such that the gas stream has the smallest possible pressure drop across the stack. It is self-understood that the stack may include and, as a rule, does include a straight inlet portion for each of the flow passages and a straight outlet portion parallel to the straight inlet portion. Between these inlet and outlet portions, the flow passages are provided with the aforementioned bends.

A particle separator of this type and of the type of the present invention can be used effectively for the removal of liquid droplets of all types from gas streams of all compositions. For example, such droplet separators are provided downstream of gas washing systems to recover liquid from the gas before the gas is admitted, for example, to an expansion turbine or released into the atmosphere.

In one prior-art system of the type described previously (see U.S. Pat. No. 2,555,125) the corrugations are more or less precisely sinusoidal in cross section. As a result, the contact locations between the crests of adjacent plates define practically line-contact patterns. The resulting gusset or runoff channel is thus fairly narrow and has been found to introduce problems.

Furthermore, the conventional unit, for a given amplitude and wavelength has been found to be incapable of sustaining extremely high input flow velocities without detrimentally affecting the separation. In other words, as the input velocity of the gas increases, the separation efficiency drops.

Furthermore, the limiting droplet size of such a system is generally relatively large. In other words small droplets are not effectively removed by the unit.

This is especially the case when, for structural purposes or otherwise, the flow passages are partitioned by walls which run orthogonal to the amplitude of the corrugations centrally through the flow passages.

OBJECTS OF THE INVENTION

It is the principal object of the present invention to provide a droplet separator which is free from the disadvantages of the prior-art unit described above and which permits, for a given amplitude and wavelength, the separator to allow for higher input gas velocities without an increase in the flow resistance, a reduction in the limiting droplet size or a significant reduction in the separating efficiency.

Still another object of this invention is to provide an improved droplet separator which is more efficient than the prior-art units for the same purpose.

SUMMARY OF THE INVENTION

We have discovered, quite surprisingly, that when the corrugations of a droplet separator of the general type described are of trapezoidal cross section, the disadvantages of the prior-art system can be removed practically entirely and a droplet separator achieved which is of significantly higher efficiency.

More particularly, the droplet separator of the present invention, for removing drops of liquid from the gas stream, comprises a stack of corrugated plates each of which is generally planar but has a plurality of corrugations formed by alternating crests and troughs of given wavelength and amplitude. The troughs of adjacent plates register with one another to define flow passages for the gas stream extending generally in a flow direction between inlet and outlet sides of the stack. The crests and troughs of the corrugations are of trapezoidal cross section in accordance with the present invention and the crests of adjacent plates contact one another between the flow passages. Each of the flow passages is formed with at least two bends in the plate plane effecting direction change in the gas flowing therethrough.

According to a feature of the present invention and the best mode currently known to us for carrying out the invention in practice, the corrugation troughs and the corrugation crests have equal base widths B, the base width being measured across the broad base of the trapezoid defined by the cross section of the corrugation troughs and crests respectively. The base width will hereinafter be designated by B.

According to the invention, the base width/wavelength ratio B/L is greater than 0.5 but less than 1. Preferably, the ratio B/L is greater than or equal to 0.6 but less than or equal to 0.75.

So that the runoff channels have an optimum configuration, it is preferred that the flanks of the crests and troughs merge with the bases thereof with radiused corners having a given radius of curvature K for all of the crests and troughs.

It has been found that best results are obtained when the base width and the radius of curvature are in a ratio K/B which is greater than or equal to 0.5 but less than or equal to 0.25 and preferably the ratio K/B is greater than or equal to 0.1 and less than or equal to 0.2.

The radiused corner is included in the measurement of the base width B.

When the trapezoidal cross section has an amplitude A (i.e. the height of a crest above a median plane through the corrugations of a plate), it is found that especially effective results are obtained for reduction of the flow resistance when the ratio of twice the amplitude A to the base width is determined within narrow limits. More particularly, the ratio of twice the amplitude A to the base B (2A/B) should be greater than or equal to 0.3 and less than or equal to 2. Preferably the value 2A/B is greater than or equal to 0.5 but less than or equal to 0.7.

According to another feature of the invention, the flanks of the troughs defining the flow passages are provided in the region of the runoff channel with capillary grooves running in the longitudinal direction of the flow channel. These capillary grooves can be formed by a more or less step-like profiling of the plates in the region of the runoff channels.

It has been found to be advantageous, in accordance with yet another feature of the invention, to form the flanks of the trapezoidal cross section of the corrugations with turbulence-producing ribs akin to rifling ribs or formations which run to the runoff channels and conduct the liquid thereto. In this case, the ribs need not be parallel to the plane of the plate but may be inclined to this plane so that they lead toward the runoff grooves.

As a result, droplets which deposit on the flanks of the trapezoidal cross section of the corrugations are induced to flow toward the runoff grooves by the pressure of the gas sweeping along these flanks.

The flow passages can be subdivided by partitions which extend in the direction of the amplitude of the corrugations along the flow passages. These partitions have been found to increase the spectrum of the droplets which can be separated by the unit from the gas, i.e. reduce the limiting droplet diameter and this has been defined previously.

In accordance with a preferred embodiment of the invention, constituting the best mode thereof, these partitions are disposed centrally in the flow passages, i.e. lie in planes perpendicular to the planes of the plates centrally in the flow passages and in the direction of flow of the gas through the unit.

In accordance with another aspect of the invention, the corrugation crests can be offset with respect to the corrugation troughs of neighboring or adjacent plates by a fraction of the base width B, thereby creating deeper runoff channels.

In a modification, in accordance with this invention and the latter aspect thereof, it has been found that especially effective functioning of the runoff channels is attained when the corrugation crests and troughs have different base widths $B_1$ and $B_2$, respectively. In this case, best results are obtained when the ratio $B_1/B_2$ is greater than 0.5 or equal thereto and is less than 1.

The latter two variants of the device of the present invention can generally be applied to the flow passages over their entire lengths. However, it is also possible to form the plates and arrange the stack so that only in the inlet portion and/or outlet portion of the flow passages, the corrugation troughs are offset relative to the corrugation crests and/or the base widths $B_1$ and $B_2$ of the corrugation crests and the corrugation troughs can be different.

The system of the present invention provides, for a given amplitude and wavelength of the corrugations, a droplet separator having a substantially higher inlet velocity for the gas without reduction in separating efficiency by comparison with prior-art devices. Furthermore, the flow resistance is not detrimentally increased. Put otherwise, the pressure drop is not detrimentally increased for high velocity gas streams with low limiting droplet size and efficiency.

In practice it has been found that the reduction of the limiting droplet size by about 20 to 75% can be achieved by comparison with prior-art devices.

BRIEF DESCRIPTION OF THE DRAWING

The above and other objects, features and advantages of the present invention will become more readily apparent from the following description, reference being made to the accompanying drawing in which:

FIG. 1 is a side-elevational view, in somewhat diagrammatic form, of a droplet separator embodying the invention;

FIG. 2 is a cross-sectional view taken along the line II—II of FIG. 1;

FIG. 3 is a view of one of the flow passages of the separator of FIG. 1 and FIG. 2 drawn to an enlarged scale;

FIG. 4 is a cross-sectional view taken along the line IV—IV of FIG. 3;

FIG. 4A is a detailed view of the region IVA of FIG. 4;

FIG. 5 is a cross-sectional view taken along the line V—V of FIG. 3;

FIG. 6 is a view similar to FIG. 3 of the flow passage of another embodiment of the invention;

FIG. 7 is a view generally similar to that of FIG. 5 illustrating still another embodiment of the invention; and FIG. 8 is a cross-sectional view similar to FIG. 7 of still another embodiment.

SPECIFIC DESCRIPTION

In FIG. 1 of the drawing, we have shown a droplet separator which has an inlet side generally represented at 5a and an outlet side generally represented at 6a and constituted of a stack of generally planar plates 1 which, however, are corrugated.

The stack is shown in greater detail in FIG. 2.

The separator of FIGS. 1 and 2 can be used in any gas flow line in which the removal of liquid droplets is desired. Generally the separator is oriented vertically as shown in FIG. 1, with the gas being admitted in the direction of arrows G and being discharged in the direction of arrows G'. A suitable use for the separator of FIG. 1 is in a gas flow duct downstream from a scrubber or gas-washing installation or in a washing tower traversed upwardly by the gas and above the spray nozzles or other scrubbing means.

As indicated earlier, the droplet separator of the present invention comprises a plurality of plates 1 each of which is provided with corrugations 2 which have a predetermined or given amplitude A or height corrugation measured from median plane P (FIG. 4) and a predetermined or given wavelength L.

The corrugation troughs of adjacent plates in the embodiment of FIGS. 1–5 register exactly with one another, i.e. the broad bases of the trapezoids defined by the troughs coincide in this embodiment. Similarly, the corrugations have crests that meet and are joined together as shown at 8' by adhesive bonding, welding or the like.

A corrugation crest has been represented at 2a in FIG. 2 and is shown to abut the crest 2b of the adjacent plate at the junction zone 8a. The corrugation trough 2c adjoining the crest 2b registers exactly with the trough 2d adjoining the crest 2a to form a flow passage which has been diagrammatically represented at 2e also in FIG. 2.

Each corrugation crest is defined by a pair of planar flanks 7 which define with the planar or straight bases 8 the trapezoids mentioned earlier (see FIG. 4).

Where the two plates join, each flow passage is formed with a runoff channel generally represented at 3 in which the liquid collects and is permitted to fall downwardly, e.g. into a tower of the aforedescribed type.

In the flow direction, the unit of FIGS. 1–5 has each flow passage provided with two bends to effect direction change. The bends are represented at 4. In the embodiment of FIG. 6, four bends 4' are provided.

In all of the embodiments illustrated, the flow passages have a straight inlet portion 5 at the upstream or inlet side 5a of the stack and a straight outlet portion 6 at the outlet side 6a of the stack.

As can be seen from FIGS. 2, 4, 5, 7 and 8, the corrugations are not of sinusoidal cross section but rather are of trapezoidal cross section, an essential feature of the invention. Nevertheless, the corrugations have a depth of about 2A, the double-headed arrow A showing the amplitude as measured to the top of a crest from the median plane or to the lowest point of a trough from this median plane. The median plane of a plate has been shown at P in FIG. 4.

The wavelength L is measured between corresponding points of a corrugation, each corrugation being understood to include a crest and a trough. The wavelength L shown in FIG. 4 is an effective illustration thereof.

In the embodiment of FIGS. 1–5 and in the embodiment represented by FIG. 6, the corrugation crests and the corrugation troughs are of equal width B. As can be seen from a comparison of FIGS. 4 and 5, moreover, in the portion of the flow passage inclined to the main flow direction, the cross section of the flow passage is smaller. At the inlet side, the corrugations 2 have a trapezoidal cross section with a base width B which has dimensions such that the ratio B/L is greater than 0.5 but less than 1 and preferably is greater than or equal to 0.6 but is less than or equal to 0.75. The latter expression can be phrased somewhat differently: the ratio B/L is at least equal to 0.6 and at most equal to 0.75.

Each runoff channel 3 is defined between corners having a radius of curvature K which radiused corners are included in the base width as it is immediately apparent from FIG. 4. The ratio K/B is at least 0.05 and at most 0.25, preferably at least 0.1 and at most 0.2.

Since the cross section of the corrugation troughs and crests is trapezoidal, the corrugations 2 are defined by straight flanks 7 and straight sections 8 as previously mentioned. The ratio 2A/B (twice amplitude to base ratio) is at least 0.3 and at most 2, preferably at least 0.5 and at most 0.7.

As can be seen from FIG. 4A, in the region of the runoff channel 3 of each flow passage and on each side of the flow passage, capillary grooves 9 can be formed in the flank 7 to run in the direction of the flow passage. While these grooves have been shown only for the embodiments of FIGS. 1–5, it should be understood that they normally will be employed for the embodiments of FIGS. 6–8 as well. As is shown in broken lines in FIG. 1, the flank 7 may also be provided with rifling-type ribs which run to the runoff channels 3, these ribs being illustrated at 10.

Within each flow passage, partitions 11, shown in dot-dash lines, can be incorporated, these partitions running in the direction of the amplitude A of the corrugations.

In the embodiment of FIG. 7, which has been found to be a significant advance over the art in performance, the corrugation crests are offset relative to the corrugation crests of the adjacent plate by a fraction of the base width B. The runoff channels 3' are thereby significantly deepened.

FIG. 8 shows a modification of the system of the present invention in which the corrugation crests and the corrugation troughs have different base widths $B_1$ and $B_2$, respectively, the ratio $B_1/B_2$ being at least 0.5 and less than 1.

It is possible in accordance with the principles of the present invention that the offset of the corrugation crests with respect to the corrugation troughs should be present only in the inlet portions 5 or the outlet portions 6 of the flow passages. In these regions the base widths $B_1$ and $B_2$ may be different from the base widths elsewhere along the flow passages.

We claim:

1. A droplet separator for removing drops of liquid from a gas stream comprising a stack of corrugated plates each generally planar but having a plurality of corrugations formed by alternating crests and troughs of given wavelength and amplitude with the troughs of adjacent plates registering generally with one another to define flow passages for said gas stream extending generally in a flow direction between inlet and outlet sides of the stack, the crests of said adjacent plates contacting one another between said flow passages, each of said flow passages being formed with at least two bends in the plate plane effecting direction change in the gas flowing therethrough, the corrugations all being of trapezoidal cross section, each of said flow passages being partitioned centrally by a partition extending in the direction of the amplitude of the corrugations.

2. The droplet separator defined in claim 1 wherein the corrugation crests and corrugation troughs have equal base widths B and the corrugations have a wavelength L measured between corresponding points of a corrugation transverse to the flow direction, the ratio B/L being greater than 0.5 and less than 1.

3. The droplet separator defined in claim 2 wherein the ratio B/L is at least 0.6 and at most 0.75.

4. The droplet separator defined in claim 2 wherein the crests and troughs of each corrugation adjoin in radiused corners, the radiused corners defining runoff channels in each flow passage, the radiused corners having a radius of curvature K, the ratio K/B being at least 0.05 and at most 0.25.

5. The droplet separator defined in claim 4 wherein said ratio K/B is at least equal to 0.1 and at most equal to 0.2.

6. The droplet separator defined in claim 4 wherein said crests and troughs each have an amplitude A measured from a median plane midway between the tops of the crests and the bottoms of the troughs between these crests, the ratio 2A/B being at least 0.3 and at most 2.

7. The droplet separator defined in claim 6 wherein the ratio 2A/B is at least 0.5 and at most 0.7.

8. The droplet separator defined in claim 1 wherein the adjacent plates define runoff channels between them in each of said passages, flanks of said flow passages in regions of said runoff channels being formed with capillary grooves extending in the direction of the flow passages.

* * * * *